United States Patent
Swaminathan et al.

(10) Patent No.: US 10,210,842 B2
(45) Date of Patent: Feb. 19, 2019

(54) TECHNIQUES OF DISPLAYING HOST DATA ON A MONITOR CONNECTED TO A SERVICE PROCESSOR DURING PRE-BOOT INITIALIZATION STAGE

(71) Applicant: American Megatrends, Inc., Norcross, GA (US)

(72) Inventors: Viswanathan Swaminathan, Suwanee, GA (US); David Wise, Loganville, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 82 days.

(21) Appl. No.: 15/426,611

(22) Filed: Feb. 7, 2017

(65) Prior Publication Data

US 2018/0226051 A1    Aug. 9, 2018

(51) Int. Cl.
  *G09G 5/00*    (2006.01)
  *G09G 5/395*   (2006.01)
  *G06T 1/20*    (2006.01)
  *G06T 1/60*    (2006.01)

(52) U.S. Cl.
  CPC ........... *G09G 5/006* (2013.01); *G06T 1/20* (2013.01); *G06T 1/60* (2013.01); *G09G 5/395* (2013.01); *G09G 2330/026* (2013.01); *G09G 2330/027* (2013.01); *G09G 2354/00* (2013.01); *G09G 2360/18* (2013.01); *G09G 2370/08* (2013.01)

(58) Field of Classification Search
  None
  See application file for complete search history.

(56) References Cited

U.S. PATENT DOCUMENTS

| | | | | |
|---|---|---|---|---|
| 6,282,646 B1* | 8/2001 | Hendry | ................. | G06F 3/14 713/100 |
| 6,970,173 B2* | 11/2005 | Ciolac | ................. | G09G 5/14 345/1.1 |
| 7,287,099 B1* | 10/2007 | Powderly | .............. | G06F 13/385 345/537 |
| 9,442,546 B2* | 9/2016 | Han | .................. | G06F 1/26 |
| 2002/0194415 A1* | 12/2002 | Lindsay | ................. | G06F 1/263 710/305 |
| 2003/0028633 A1* | 2/2003 | Lindsay | ................. | G06F 1/263 709/224 |
| 2006/0143344 A1* | 6/2006 | Lindsay | ................. | G06F 1/263 710/105 |

(Continued)

*Primary Examiner* — Ryan M Gray
(74) *Attorney, Agent, or Firm* — Locke Lord LLP; Tim Tingkang Xia, Esq.

(57) ABSTRACT

In an aspect of the disclosure, a method, a computer-readable medium, and an apparatus are provided. The apparatus may be a service processor. The service processor emulates a frame buffer. The service processor determines whether the service processor is configured to generate display signals to be sent to a display based on images from the service processor or based on images from a host of the service processor. When the service processor is configured to generate the display signals based on the images from the service processor, the service processor generates a first image based on serial data received from the host through a serial port, writes the first image to the emulated frame buffer, and generates a first display signal to be sent to the display based on the first image from the emulated frame buffer.

20 Claims, 5 Drawing Sheets

(56) References Cited

U.S. PATENT DOCUMENTS

| | | | | |
|---|---|---|---|---|
| 2008/0005222 A1* | 1/2008 | Lambert | ............... | G06F 3/0227 |
| | | | | 709/203 |
| 2009/0055157 A1* | 2/2009 | Soffer | ................. | G06F 15/7864 |
| | | | | 703/27 |
| 2012/0173755 A1* | 7/2012 | Margulis | ................... | G06F 3/14 |
| | | | | 709/231 |
| 2013/0265328 A1* | 10/2013 | Lambert | ............... | G06F 11/321 |
| | | | | 345/629 |
| 2016/0321778 A1* | 11/2016 | Vidyadhara | ......... | G06F 3/03543 |
| 2016/0366239 A1* | 12/2016 | Rabeela | .............. | H04L 67/2819 |
| 2017/0337147 A1* | 11/2017 | Patel | ................... | G06F 13/4282 |

* cited by examiner

TECHNIQUES OF DISPLAYING HOST DATA ON A MONITOR CONNECTED TO A SERVICE PROCESSOR DURING PRE-BOOT INITIALIZATION STAGE

BACKGROUND

Field

The present disclosure relates generally to computer systems, and more particularly, to techniques of displaying, by a service processor, serial data received from a host on a monitor connected to the service processor during a pre-boot initialization stage of the host.

Background

The statements in this section merely provide background information related to the present disclosure and may not constitute prior art.

Considerable developments have been made in the arena of server management. An industry standard called Intelligent Platform Management Interface (IPMI), described in, e.g., "IPMI: Intelligent Platform Management Interface Specification, Second Generation," v.2.0, Feb. 12, 2004, defines a protocol, requirements and guidelines for implementing a management solution for server-class computer systems. The features provided by the IPMI standard include power management, system event logging, environmental health monitoring using various sensors, watchdog timers, field replaceable unit information, in-band and out of band access to the management controller, simple network management protocol (SNMP) traps, etc.

A component that is normally included in a server-class computer to implement the IPMI standard is known as a Baseboard Management Controller (BMC). A BMC is a specialized microcontroller embedded on the motherboard of the computer, which manages the interface between the system management software and the platform hardware. The BMC generally provides the "intelligence" in the IPMI architecture.

A BMC may require a firmware image to make them operational. "Firmware" is software that is stored in a read-only memory (ROM) (which may be reprogrammable), such as a ROM, programmable read-only memory (PROM), erasable programmable read-only memory (EPROM), electrically erasable programmable read-only memory (EEPROM), etc. The BMC may be considered as an embedded-system device or a service processor.

Typical basic input/output system (BIOS) and even Non-BIOS systems (e.g., PowerPC systems) need to execute substantial pre-boot initialization routines such as configuring dual in-line memory modules (DIMMs), memory buffers, processors as well as performing certain platform level initialization before the systems can start booting the BIOS or host firmware. This pre-boot initialization may be long and may take up to 30 seconds or even more, depending on the complexity of the system.

In these kind of the systems, during this pre-boot initialization stage, a host is not in a position to display data on a host monitor directly. Therefore, there is a need for a mechanism that can display host data on a monitor connected to the service processor during the pre-boot initialization stage.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a service processor. The service processor may have the capability to generate display signals to be sent to a display/monitor and the host will route its display through the service processor in a normal working situation. The service processor emulates a frame buffer. The service processor determines whether the service processor is configured to generate display signals to be sent to a display based on images from the service processor or based on images from a host of the service processor. When the service processor is configured to generate the display signals based on the images from the service processor, the service processor generates a first image based on serial data received from the host through a serial port, writes the first image to the emulated frame buffer, and generates a first display signal to be sent to the display based on the first image from the emulated frame buffer.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of computer systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Typical basic input/output system (BIOS) and even Non-BIOS systems (e.g., PowerPC systems) need to execute substantial pre-boot initialization routines such as configuring dual in-line memory modules (DIMMs), memory buffers, processors as well as performing certain platform level initialization before the systems can start booting the BIOS or host firmware. This pre-boot initialization may be long and may take up to 30 seconds or even more, depending on the complexity of the system.

In these kind of the systems, during this pre-boot initialization stage, the pre-boot code (either in BIOS or host firmware) does not have access to a Peripheral Component Interconnect (PCI)/Peripheral Component Interconnect Express (PCIe) memory space. In the case of a service processor enabled server environment, the service processor that interfaces as the video controller for a host is accessible only via PCI/PCIe memory space. If pre-boot BIOS or host firmware of the host cannot access the PCI/PCIe memory space, then the pre-boot BIOS or host firmware may not be able to output display image data to the service processor. Therefore, nothing can be displayed on a physical monitor connected service processor until the pre-boot initialization completes at the host, which is when the pre-boot BIOS or host firmware gains capability to access the PCI/PCIe memory space.

As a result, the physical monitor connected to the service processor can potentially be blank even though the host is booting in the background. The same result may occur for remote keyboard-video-mouse (KVM) viewer connected to the service processor. This behavior of the system may potentially lead to confusion to front-end users who may think that the host is not booting properly, as the monitor or KVM redirection is blank, and even after executing power control operations (e.g., a physical button push or a remote power control command).

Therefore, there is a need for a mechanism that can display host data on a monitor connected to the service processor during the pre-boot initialization stage.

Figure 1:
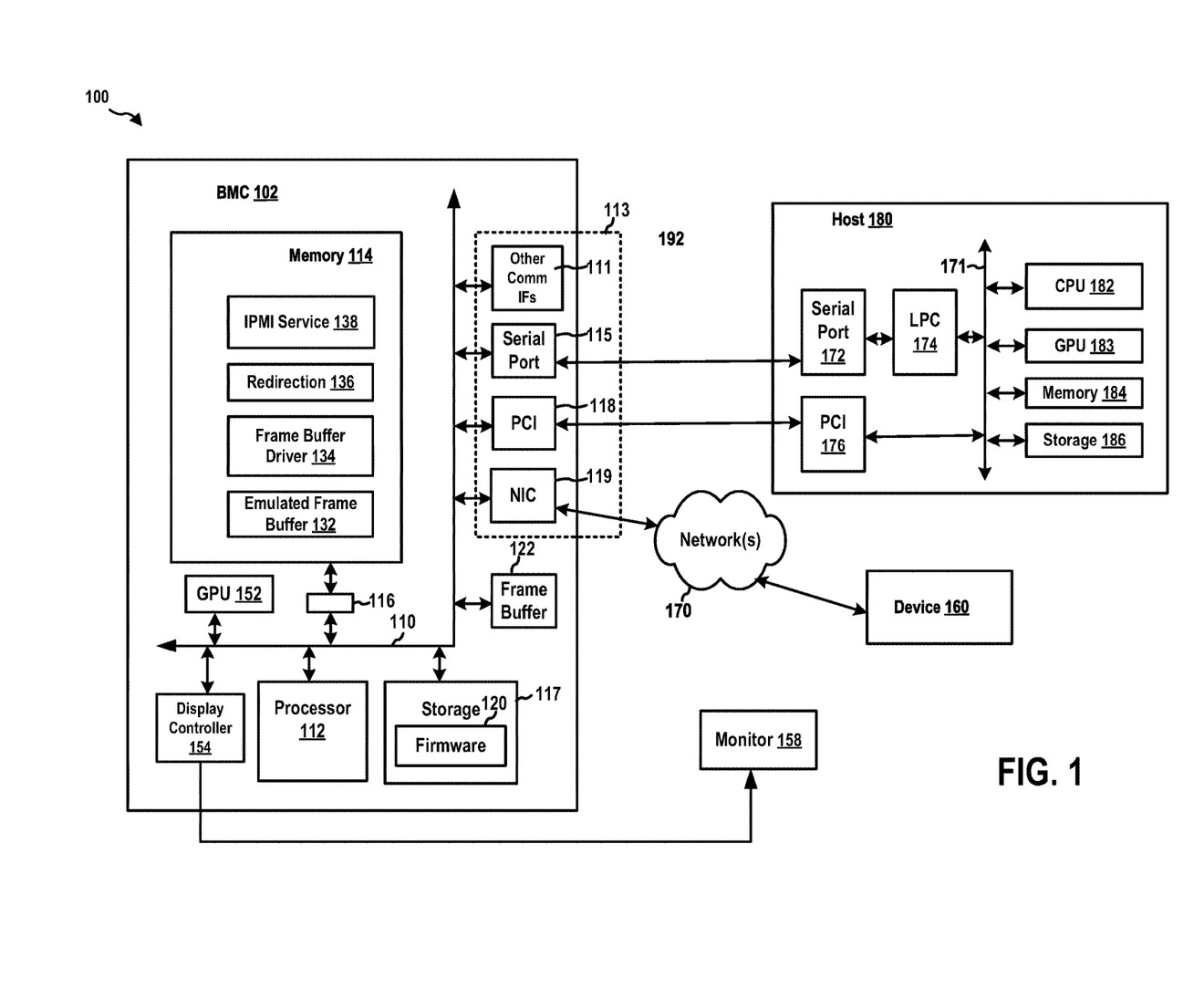
FIG. 1 is a diagram illustrating a computer system.

FIG. 1 is a diagram 100 illustrating a computer system. In this example, the computer system includes, among other devices, a BMC 102, a host computer 180, and a remote device 160. The BMC 102 may be in communication with a monitor 158.

The BMC 102 has a processor 112, a memory 114, a memory driver 116, a storage 117, a physical frame buffer 122, and communication interfaces such as a serial port 115, a PCI/PCIe interface 118, a network interface card 119, and/or other communication interface(s) 111. In certain configurations, the physical frame buffer 122 may be part of the memory 114. In certain configurations, one or more of the above components may be implemented as a system-on-a-chip (SoC). For examples, the processor 112, the memory 114, the GPU 152, the display controller 154, the storage 117, and the physical frame buffer 122 may be on the same SoC. Further, the BMC 102 may support IPMI and may have an IPMI interface 113. The IPMI interface 113 may be implemented over the serial port 115, the PCI/PCIe interface 118, the network interface card 119, and/or the communication interface(s) 111. The communication interface(s) 111 may include a keyboard controller style (KCS), a server management interface chip (SMIC), a block transfer (BT) interface, a system management bus system interface (SSIF), a Universal Serial Bus (USB) interface, and/or other suitable communication interface(s). The memory 114, the processor 112, the memory driver 116, the storage 117, the serial port 115, the PCI/PCIe interface 118, the network interface card 119, and/or the communication interface(s) 111 may be in communication with each other through a communication channel 110 such as a bus architecture.

The BMC 102 may store BMC firmware 120 in the storage 117. When the processor 112 executes the BMC firmware 120, the processor 112 loads code and data of the BMC firmware 120 into the memory 114. This example shows that the BMC firmware 120 provides in the memory 114, among other components, an IPMI service 138, a redirection component 136, and an emulation frame buffer driver 134. As described supra, the IPMI service 138 may receive and send IPMI messages through the IPMI interface 113. The redirection component 136 may redirect KVM data to the remote device 160 through a network 170.

The BMC 102 may be in communication with the host computer 180 through the serial port 115, the PCI/PCIe interface 118, the network interface card 119, the communication interface(s) 111, and/or the IPMI interface 113. The BMC 102 may manage the host computer 180. The host computer 180 includes, among other components, a host CPU 182, a host GPU 183, a host memory 184, a host storage 186, a low pin count (LPC) bus 174, a host serial port 172, and a host PCI/PCIe interface 176. The host CPU 182, the host GPU 183, the host memory 184, the host storage 186, the LPC bus 174, and the host PCI/PCIe interface 176 may be in communication with each other through a host communication channel 171. The host communication channel 171 may be a bus architecture. The host serial port 172 is in communication with the host communication channel 171 via the LPC bus 174.

Further, the serial port 115 of the BMC 102 is in communication with the host serial port 172 of the host computer 180 via a communication link. The PCI/PCIe interface 118 is in communication with the host PCI/PCIe interface 176 of the host computer 180 via a communication link. The host CPU 182 or the host GPU 183 may write image data to the physical frame buffer 122 of the BMC 102 through the communication link between the host PCI/PCIe interface 176 and the PCI/PCIe interface 118, e.g., utilizing the PCI/PCIe memory space.

The host computer 180 may also include, among other components, a CPU temperature sensor (not shown) or other sensors (not shown) as well as a CPU fan (not shown) or other hardware components (not shown), which are managed by the BMC 102. The sensors are hardware components and measure operating characteristics such as temperature, current, voltage, power supplies, fans, memory, or any other appropriate operating parameters that affects performance. For instance, the CPU temperature sensor (not shown) monitors the temperature of the host CPU 182. The other sensors (not shown) may monitor voltage levels of the host computer 180, temperature levels for the host computer 180, cooling fan presence and operation, physical hard disk drive presence and operation, and/or errors in memory, etc. Further, the hardware components of the host computer 180 may be operated, e.g., under the management of the BMC 102, to adjust the one or more operating characteristics of the host computer 180. For example, the CPU fan (not shown) may be operated to adjust the temperature of the host CPU 182.

The communications between the BMC 102 and the remote device 160 may be carried over the network 170 (e.g., a local area network (LAN)). In this example, the BMC 102 may be in communication with the network 170 through the network interface card 119.

When the BMC 102 is started (e.g., powered on) and begins to execute the BMC firmware 120, the processor 112, under the instructions of the BMC firmware 120, may allocate a memory space of the memory 114 for an emulated frame buffer 132, as described infra. For example, the allocated memory space may be 8 MB, 16 MB, or 32 MB in size. Further, during the start-up processes, the processor 112 of the BMC 102, as part of loading BMC component drivers, also loads the emulation frame buffer driver 134 into the memory 114. The emulation frame buffer driver 134 can be used by the GPU 152 or other components of the BMC 102 to write image data into the emulated frame buffer 132. Further, in certain configurations, the GPU 152 may be also instructed or configured to write image data into the physical frame buffer 122. The display controller 154 may be instructed or configured to read image data from the emulated frame buffer 132 or the physical frame buffer 122 and, accordingly, generates display signals. In particular, a register of the BMC 102 may be used to indicate whether the display controller 154 should read image data from the emulated frame buffer 132 or the physical frame buffer 122. The display signals are sent to the monitor 158, which accordingly displays images.

More specifically, the BMC 102 may be configured to instruct the display controller 154 to read image data from the physical frame buffer 122, which receives the image data from the host computer 180 through the PCI/PCIe interface 118. For example, the processor 112 may, under the instruction of the BMC firmware 120, set the register in the BMC 102 to a first predetermined value indicating that the display controller 154 should read the image data from the physical frame buffer 122. This may be referred to as that the BMC 102 is to set keep the host computer 180 as the owner of the display controller 154. This allows that, if the BMC 102 is rebooted with the host computer 180 up and running, KVM applications and the monitor 158 will continue to be in a proper state, as the host computer 180 owns the display controller 154.

In one example, initially the host computer 180 is in an off state (e.g., turned off). When a user performs a power control operation to power on the host, the BMC 102 first sets the register in the BMC 102 to a second predetermined value indicating that the display controller 154 should read the image data from the emulated frame buffer 132. In other words, the BMC 102 switches the ownership of the display controller 154 to the BMC 102 itself. Accordingly, the display controller 154 uses the emulated frame buffer 132 instead of the physical frame buffer 122.

As described supra, the start-up process of the host computer 180 includes a pre-boot initialization stage, in which the host computer 180 does not have access to the host PCI/PCIe interface 176. During this stage, the host CPU 182 may, however, output serial data to the host serial port 172 through the LPC bus 174. The data may be intended to be received by a Universal Asynchronous Receiver/Transmitter (UART) device or a serial console connected to the host serial port 172. Through the communication link between the host serial port 172 and the serial port 115, the BMC 102 receives the serial data at the serial port 115.

At the BMC 102, the processor 112 may run a monitor process that continuously monitor for any serial data available at the serial port 115. When any serial data are available, the monitor process may obtain the serial data from the serial port 115 and may provide the serial data to the GPU 152. The GPU 152 then may use the emulation frame buffer driver 134 to write image data (i.e., an image) representing those serial data into the emulated frame buffer 132.

On the other hand, the display controller 154 checks the register in the BMC 102 to determine whether the display controller 154 should read image data from the emulated frame buffer 132 or the physical frame buffer 122. In other words, the display controller 154 determines whether the BMC 102 owns the display controller 154 or the host computer 180 owns the display controller 154. In this example, the display controller 154 determines that the BMC 102 owns the display controller 154, e.g., based on the second predetermined value in the register. When the BMC 102 owns the display controller 154, the display controller 154 accordingly reads the image data from the emulated frame buffer 132 and generates display signals. As such, whatever image data that are written in the emulated frame buffer 132 will be displayed by the display controller 154 on the monitor 158. This procedure allows data from the host computer 180 intended for, e.g., a serial console or UART device, to be displayed on the monitor 158.

After the host computer 180 has initiated the host PCI/PCIe interface 176 and established the communication link between the host PCI/PCIe interface 176 and the PCI/PCIe interface 118 of the BMC 102, the host GPU 183 can start writing image data to the physical frame buffer 122 of the BMC 102 through the host PCI/PCIe interface 176. In certain configurations, the host computer 180 may have access to the register of the BMC 102 via LPC bus 174 or the host PCI/PCIe interface 176. Then, host computer 180 may set the value of the register to the first predetermined value, indicating that the host computer 180 owns the display controller 154. Accordingly, the display controller 154 read the image data from the physical frame buffer 122 and displays the image on the monitor 158.

In certain configurations, the BMC 102 can also monitor indications such as the power-on self-test (POST) codes, logic sensor states, or other code/messages sent to the BMC 102. The BMC 102 can check those indications to determine the hardware initialization status of the host computer 180. In certain configurations, the host computer 180 may send IPMI messages to the BMC 102 through the IPMI interface 113. The IPMI messages may indicate the status of hardware components initiation. Once the BMC 102 determines, based on the received indications, that the host PCI/PCIe interface 176 of the host computer 180 has been initialized, the BMC 102 can set the value of the register to the first predetermined value, indicating that the host computer 180 now owns the display controller 154.

Further, when a user powers off the host computer 180 by using remote power control commands or by pressing the power button, if at that time the BMC 102 owns the display controller 154, the BMC 102 may switch the ownership of the display controller to the host computer 180. This procedure allows that, even if errors occur at the execution of the BMC firmware 120, the display controller 154 can still read the image data, which are written by the host computer 180, from the physical frame buffer 122 and displays images from the host computer 180 on the monitor 158.

In certain configurations, the BMC 102 may utilize the redirection component 136 to redirect KVM data to the remote device 160. Accordingly, when the BMC 102 owns the display controller 154, in addition to displaying images representing the serial data onto the monitor 158, the redirection component 136 can also redirect the images to the remote device 160. For example, the images can be displayed at a KVM viewer application on the remote device 160. The redirection component 136 may be configured or instructed to read image data from the emulated frame buffer 132 instead of the physical frame buffer 122. Accordingly, those image data are redirected to the remote device 160.

In certain configurations, using the techniques described supra, a service processor (e.g., the BMC 102) can aid in displaying host serial data on a monitor connected to the service processor when the host is in the pre-boot initialization stage.

Further, the service processor can also display host serial data on the monitor connected to the service processor when the host front end (e.g., X sever) is hung and debug data are not available. This mechanism can help users by displaying useful debug or error information when the host front-end is hung or frozen.

Furthermore, the ownership of the display controller at the service processor can easily be toggled either by a user (using remote commands) or by the host itself, when the host determines that the host is ready to take over the ownership of the display controller and to display images.

In addition, ASCII Texts from the host may also be displayed on the monitor connected to the service processor.

Figure 2:
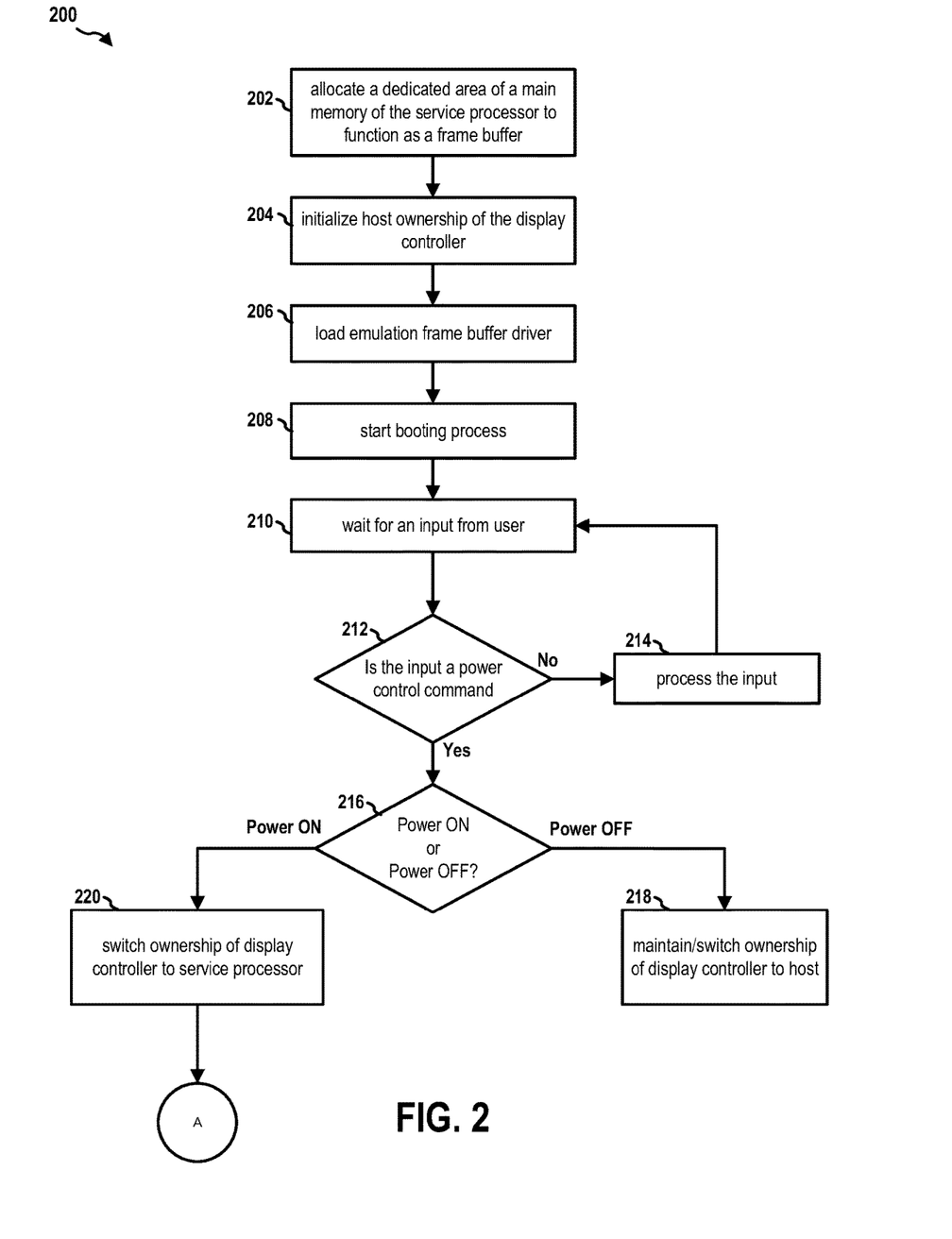
FIG. 2 is a flow chart of a method (process) for operating a service processor.

FIG. 2 is a flow chart 200 of a method (process) for operating a service processor. The service processor may be a BMC (e.g., the BMC 102 and the apparatus 102' of FIG. 4). The service processor manages a host (e.g., the host computer 180) and is connected to a display (e.g., the monitor 158).

After the service processor is powered on, at operation 202, the service processor emulates a frame buffer. In particular, the service processor allocates a dedicated area of a main memory (e.g., the memory 114) of the service processor to function as a frame buffer (e.g., the emulated frame buffer 132). Further, the service processor configures a graphics processing unit (e.g., the GPU 152) of the service processor to write images from the service processor (i.e., image data generated by the service processor) to the dedicated area. The service processor configures a display controller (e.g., the display controller 154) of the service processor to read, from the dedicated area, the images from the service processor and to generate the display signals based on the images from the service processor.

At operation 204, the service processor initializes a host ownership of the display controller of the service processor. That is, the service processor configures the display controller to generate display signals based on the images from the host (e.g., images in the physical frame buffer 122 written by the host computer 180).

At operation 206, the service processor loads an emulation frame buffer driver (e.g., the emulation frame buffer driver 134) into the memory. At operation 208, the service processor starts a booting process. At operation 210, the service processor waits for an input from a user. After receiving an input from a user, at operation 212, the service processor determines whether the input is a power control command. When the input is not a power control command, at operation 214, the service processor proceeds to processing the input. Subsequently, the service processor proceeds back to operation 210.

When the input is a power control command (e.g., the service processor receives a power control command directed to the host), at operation 216, the service processor determines whether the power control command is a Power ON command or a Power OFF command.

When the power control command is a Power OFF command, at operation 218, the service processor maintains the host ownership of the display controller. If for any reason the ownership of the display controller is not with the host, the service processor switches the ownership of the display controller back to the host. Further, the service processor may power off the host.

When the power control command is a Power ON command, at operation 220, the service processor switches the ownership of the display controller to the service processor. In particular, the service processor may be configured to generate the display signals based on the images from the service processor. The service processor may accordingly power on the host. Subsequently, the service processor proceeds to the operations shown in FIG. 3.

Figure 3:
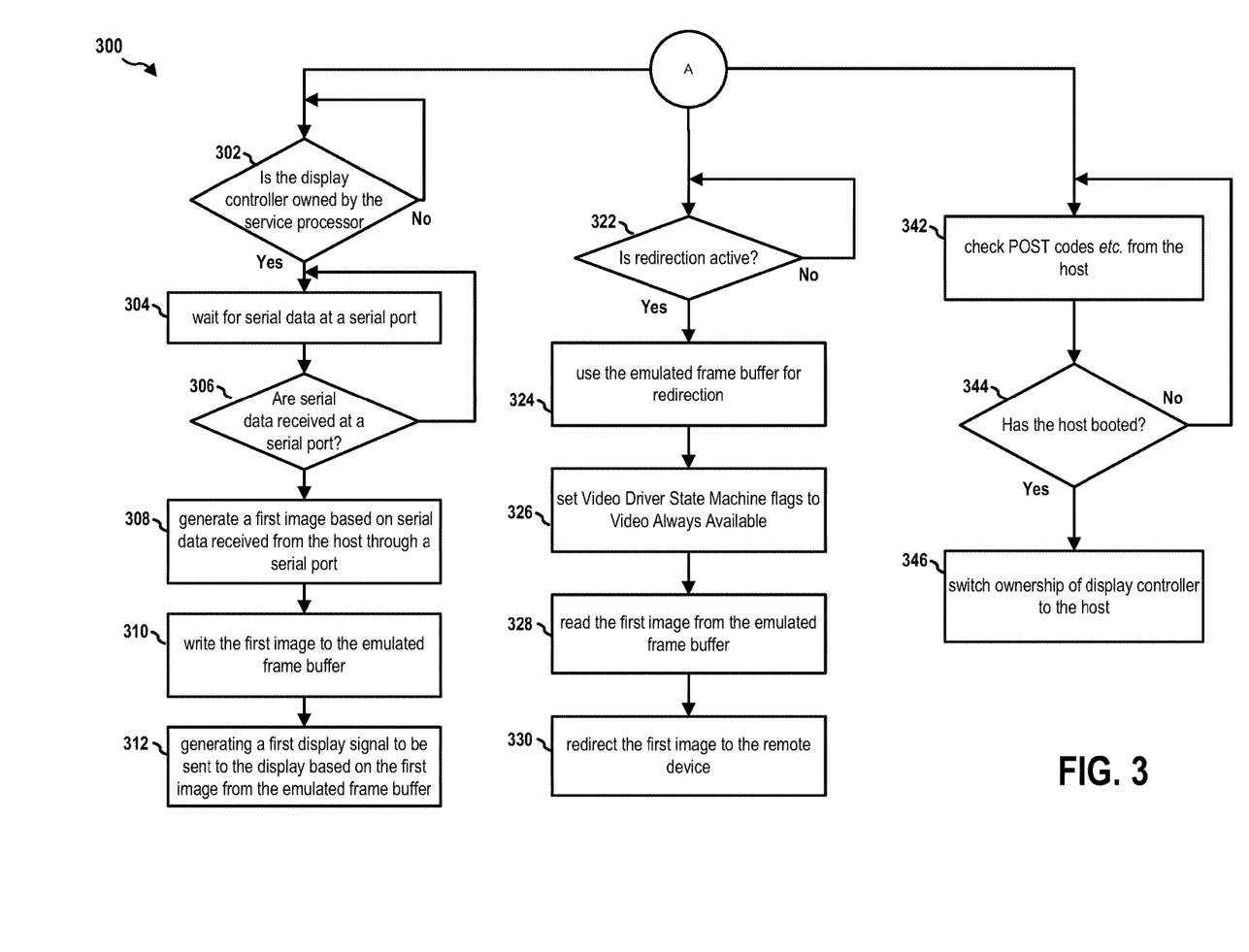
FIG. 3 is a flow chart of another 0method (process) for operating a service processor.

FIG. 3 is a flow chart 300 of a method (process) for operating a service processor. The service processor may be a BMC (e.g., the BMC 102, the apparatus 102' of FIG. 4). The service processor manages a host (e.g., the host computer 180).

Subsequent to operation 220 shown in FIG. 2, in certain configurations, the service processor proceeds to operation 302. At operation 302, the service processor determines whether the display controller is owned by the service processor. In other words, the service processor determines whether the service processor is configured to generate display signals to be sent to the display based on the images from the service processor, rather than based on images from a host of the service processor. When the display controller is not owned by the service processor, the service processor returns to the beginning of the operation 302.

When the display controller is owned by the service processor (i.e., when the display controller is configured to generate the display signals based on the images from the service processor), at operation 304, the service processor waits for serial data at a serial port (e.g., the serial port 115) of the service processor. At operation 306, the service processor detects whether the serial data from the host are received at the serial port of the service processor. When the service processor has not received serial data at the serial port, the service processor returns to operation 304.

When the service processor has received or detected serial data at the serial port, at operation 308, the service processor generates a first image based on the serial data received from the host through the serial port. In certain configurations, the first image is generated in response to the detection. At operation 310, the service processor writes the first image to the emulated frame buffer. At operation 312, the service processor generates a first display signal to be sent to the display based on the first image from the emulated frame buffer. In certain configurations, the first image is written to the dedicated area by the graphics processing unit, and the first display signal is generated by the display controller.

Subsequent to operation 220 shown in FIG. 2, in certain configurations, the service processor proceeds to operation 322. At operation 322, the service processor determines whether the service processor is active to redirect video of the host to a remote device (e.g., remote device 160). When redirection is not active at the service processor, the service processor returns to the beginning of the operation 322.

When redirection is active at the service processor, at operation 324, the service processor uses the emulated frame buffer for redirection. At operation 326, the service processor sets Video Driver Machine flags to Video Always Available, the reason being that the service processor is generating the image and loading it into the emulated frame buffer by itself. Thus, service processor may not be able to determine from a video engine of an KVM redirection service dynamically whether the video has changed in the host. At operation 328, the service processor reads the first image from the emulated frame buffer. At operation 330, the service processor redirects the first image to the remote device.

Subsequent to operation 220 shown in FIG. 2, in certain configurations, the service processor proceeds to operation 342. At operation 342, the service processor receives an indication from the host. The indication may be a Power-On Self-Test (POST) code, a logic sensor state, or an IPMI message. The service processor then checks the indication (e.g., POST codes).

At operation 344, the service processor determines whether the host has fully booted based on the indication. When the host has not fully booted, the service processor returns to operation 342.

When the host has fully booted, at operation 346, the service processor switches the ownership of the display controller to the host. In particular, the service processor may be configured to generate the display signals based on the images from the host (e.g., image data written to the physical frame buffer 122 by the host GPU 183).

Figure 4:
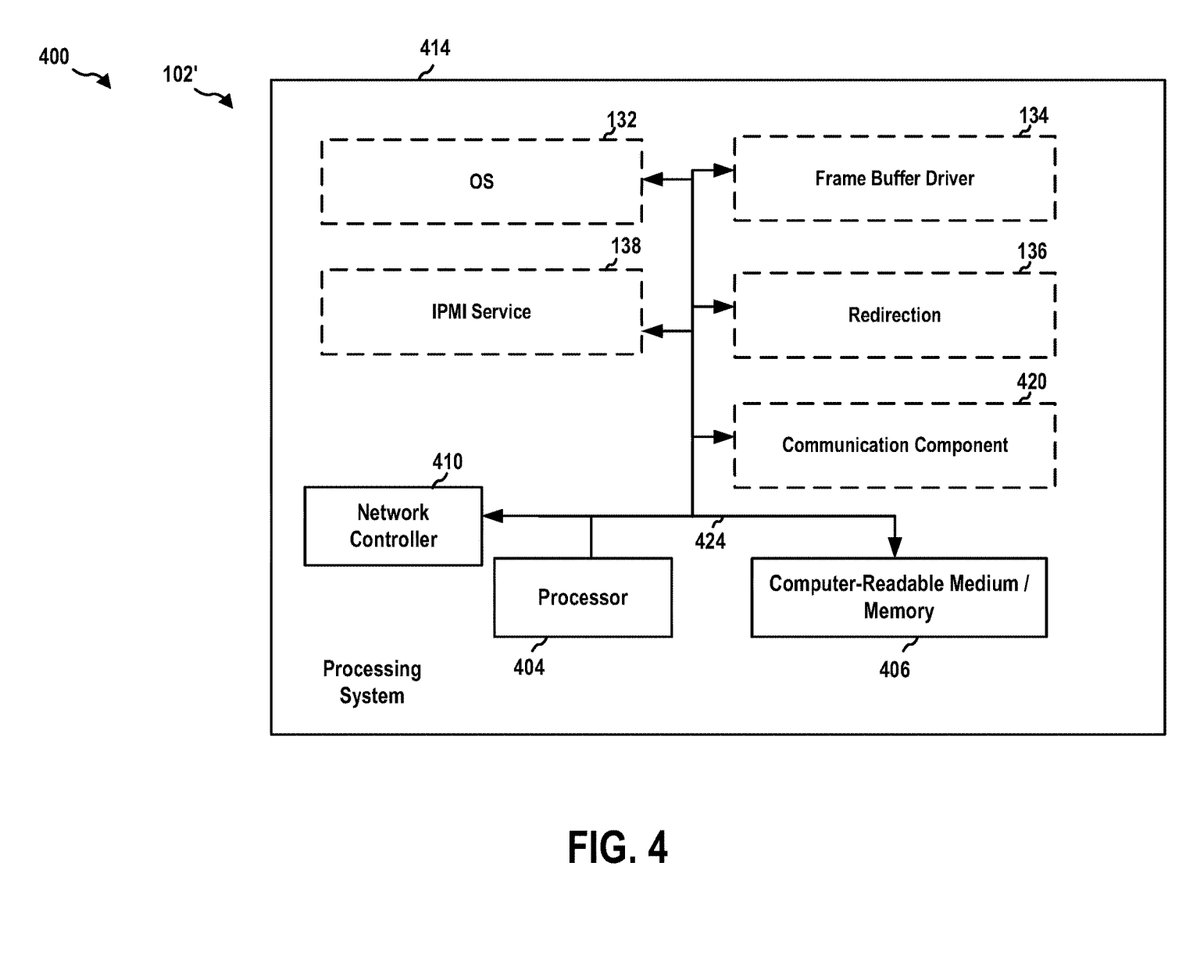
FIG. 4 is a diagram illustrating an example of a hardware implementation for an apparatus employing a processing system.

FIG. 4 is a diagram 400 illustrating an example of a hardware implementation for an apparatus 102' employing a processing system 414. The apparatus 102' may implement the BMC 102. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware components, represented by the processor 404, the emulation frame buffer driver 134, the redirection component 136, the IPMI service 138, and the computer-readable medium/memory 406. In particular, the computer-readable medium/memory 406 may include the memory 114 and the storage 117. The bus 424 may also link various other circuits such as timing sources, peripherals, voltage regulators, and power management circuits, which are well known in the art, and therefore, will not be described any further.

The processing system 414 may be coupled to a network controller 410. The network controller 410 provides a means for communicating with various other apparatus over a network. The network controller 410 receives a signal from the network, extracts information from the received signal, and provides the extracted information to the processing system 414, specifically a communication component 420 of the apparatus 102'. In addition, the network controller 410 receives information from the processing system 414, specifically the communication component 420, and based on the received information, generates a signal to be sent to the network. The processing system 414 includes a processor 404 coupled to a computer-readable medium/memory 406. The processor 404 is responsible for general processing, including the execution of software stored on the computer-readable medium/memory 406. The software, when executed by the processor 404, causes the processing system 414 to perform the various functions described supra for any particular apparatus. The computer-readable medium/memory 406 may also be used for storing data that is manipulated by the processor 404 when executing software. The processing system further includes at least one of the emulation frame buffer driver 134, the redirection component 136, the IPMI service 138. The components may be software components running in the processor 404, resident/stored in the computer readable medium/memory 406, one or more hardware components coupled to the processor 404, or some combination thereof.

The apparatus 102' may be configured to include means for performing operations described supra referring to FIGS. 2-3. The aforementioned means may be one or more of the aforementioned components of the apparatus 102 and/or the processing system 414 of the apparatus 102' configured to perform the functions recited by the aforementioned means.

Figure 5:
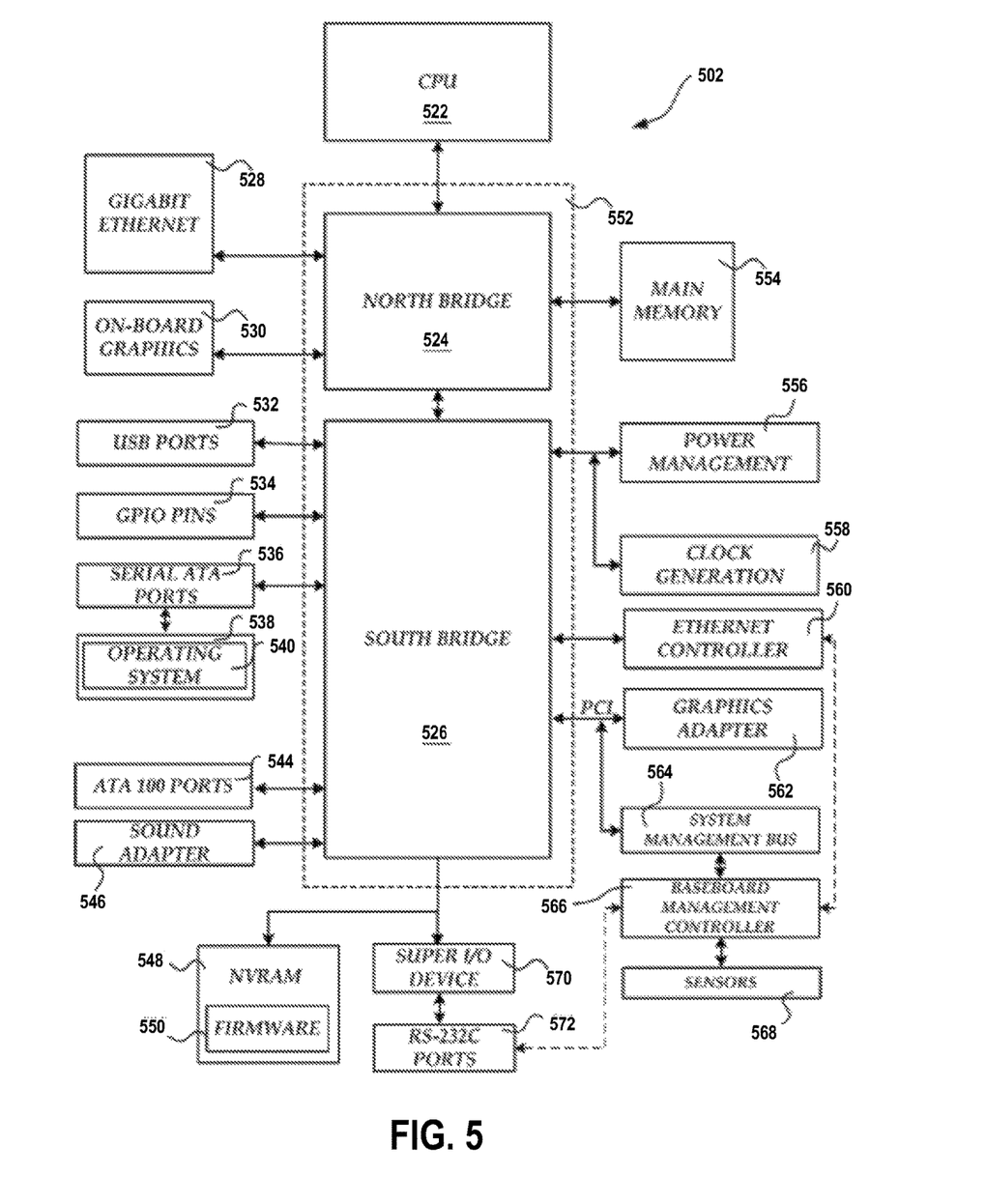
FIG. 5 shows a computer architecture for a computer.

FIG. 5 and the following discussion are intended to provide a brief, general description of one suitable computing environment in which aspects of the embodiments described herein may be implemented. In particular, FIG. 5 shows a computer architecture for a computer 502 that may be utilized to embody the host computer 180, as described supra. It should be appreciated that the computer architecture shown in FIG. 5 is merely illustrative and that other types of computers and computing devices may also be utilized to implement aspects of the embodiments presented herein.

While aspects presented herein include computer programs that execute in conjunction with the execution of an operating system, those skilled in the art will recognize that the embodiments may also be implemented in combination with other program modules and/or hardware devices. As described herein, computer programs include routines, programs, components, data structures, and other types of structures that perform particular tasks or implement particular abstract data types. Moreover, those skilled in the art will appreciate that the embodiments described herein may be practiced with other computer system configurations, including hand-held devices, multiprocessor systems, microprocessor-based or programmable consumer electronics, minicomputers, mainframe computers, and the like. The embodiments described herein may also be practiced in distributed computing environments where tasks are performed by remote processing devices that are linked through a communications network. In a distributed computing environment, program modules may be located in both local and remote memory storage devices.

The computer 502 shown in FIG. 5 includes a baseboard, or "motherboard," which is a printed circuit board to which a multitude of components or devices may be connected by way of a system bus or other electrical communication path. In one illustrative embodiment, a CPU 522 operates in conjunction with a chipset 552. The CPU 522 is a standard central processor that performs arithmetic and logical operations necessary for the operation of the computer. The server computer 502 may include a multitude of CPUs 522.

The chipset 552 includes a north bridge 524 and a south bridge 526. The north bridge 524 provides an interface between the CPU 522 and the remainder of the computer 502. The north bridge 524 also provides an interface to a random access memory ("RAM") used as the main memory 554 in the computer 502 and, possibly, to an on-board graphics adapter 530. The north bridge 524 may also include functionality for providing networking functionality through a gigabit Ethernet adapter 528. The gigabit Ethernet adapter 528 is capable of connecting the computer 502 to another computer via a network. Connections which may be made by the network adapter 528 may include LAN or WAN connections. LAN and WAN networking environments are commonplace in offices, enterprise-wide computer networks, intranets, and the internet. The north bridge 524 is connected to the south bridge 526.

The south bridge 526 is responsible for controlling many of the input/output functions of the computer 502. In particular, the south bridge 526 may provide one or more USB ports 532, a sound adapter 546, an Ethernet controller 560, and one or more GPIO pins 534. The south bridge 526 may also provide a bus for interfacing peripheral card devices such as a graphics adapter 562. In one embodiment, the bus comprises a PCI bus. The south bridge 526 may also provide a system management bus 564 for use in managing the various components of the computer 502. Additional details regarding the operation of the system management bus 564 and its connected components are provided below.

The south bridge 526 is also operative to provide one or more interfaces for connecting mass storage devices to the computer 502. For instance, according to an embodiment, the south bridge 526 includes a serial advanced technology attachment ("SATA") adapter for providing one or more SATA ports 536 and an ATA 100 adapter for providing one or more ATA 100 ports 544. The SATA ports 536 and the ATA 100 ports 544 may be, in turn, connected to one or more mass storage devices such as the SATA disk drive 538 storing an operating system 540 and application programs.

As known to those skilled in the art, an operating system 540 comprises a set of programs that control operations of a computer and allocation of resources. An application program is software that runs on top of the operating system software, or other runtime environment, and uses computer resources to perform application specific tasks desired by the user. According to one embodiment of the invention, the operating system 540 comprises the LINUX operating system. According to another embodiment of the invention the operating system 540 comprises an operating system within the WINDOWS family of operating systems from MICROSOFT CORPORATION. According to another embodiment, the operating system 540 comprises the UNIX, LINUX, or SOLARIS operating system. It should be appreciated that other operating systems may also be utilized.

The mass storage devices connected to the south bridge 526, and their associated computer storage media, provide non-volatile storage for the computer 502. Although the description of computer storage media contained herein refers to a mass storage device, such as a hard disk or CD-ROM drive, it should be appreciated by those skilled in the art that computer storage media can be any available media that can be accessed by the computer 502.

By way of example, and not limitation, computer storage media may comprise volatile and non-volatile, removable and non-removable media implemented in any method or technology for storage of information such as computer-readable instructions, data structures, program modules or other data. Computer storage media also includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer.

According to embodiments, a low pin count (LPC) interface may also be provided by the south bridge 526 for connecting a "Super I/O" device 570. The Super I/O device 570 is responsible for providing a number of input/output ports, including a keyboard port, a mouse port, a serial interface 572, a parallel port, and other types of input/output ports. The LPC interface may also connect a computer storage media such as a ROM or a flash memory such as a NVRAM 548 for storing the firmware 550 that includes program code containing the basic routines that help to start up the computer 502 and to transfer information between elements within the computer 502.

As described briefly above, the south bridge 526 may include a system management bus 564. The system management bus 564 may include a BMC 566. The BMC 566 may be the BMC 102. In general, the BMC 566 is a microcontroller that monitors operation of the computer system 502. In a more specific embodiment, the BMC 566 monitors health-related aspects associated with the computer system 502, such as, but not limited to, the temperature of one or more components of the computer system 502, speed of rotational components (e.g., spindle motor, CPU Fan, etc.) within the system, the voltage across or applied to one or more components within the system 502, and the available or used capacity of memory devices within the system 502. To accomplish these monitoring functions, the BMC 566 is communicatively connected to one or more components by way of the management bus 564. In an embodiment, these components include sensor devices 568 for measuring various operating and performance-related parameters within the computer system 502. The sensor devices 568 may be either hardware or software based components configured or programmed to measure or detect one or more of the various operating and performance-related parameters.

It should also be appreciated that the computer 502 may comprise other types of computing devices, including handheld computers, embedded computer systems, personal digital assistants, and other types of computing devices known to those skilled in the art. It is also contemplated that the computer 502 may not include all of the components shown in FIG. 5, may include other components that are not explicitly shown in FIG. 5, or may utilize an architecture completely different than that shown in FIG. 5.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a service processor, comprising:
    emulating a frame buffer;
    determining whether the service processor is configured to generate display signals to be sent to a display based on images from the service processor or based on images from a host of the service processor;
    when the service processor is configured to generate the display signals based on the images from the service processor:
        generating a first image based on serial data received from the host through a serial port;
        writing the first image to the emulated frame buffer; and
        reading the first image from the emulated frame buffer and generating a first display signal to be sent to the display based on the first image;
    when the service processor is configured to generate the display signals based on images from a host:
        receiving and storing, at a physical buffer, a second image from the host; and
        reading the second image from the physical frame buffer and generating a second display signal to be sent to the display based on the second image.

2. The method of claim 1, wherein the emulating the frame buffer includes:
    (a) allocating a dedicated area of a main memory of the service processor to function as a frame buffer,
    (b) configuring a graphics processing unit of the service processor to write the images from the service processor to the dedicated area, and
    (c) configuring a display controller of the service processor to read, from the dedicated area, the images from the service processor and to generate the display signals based on the images from the service processor;
    wherein the first image is written to the dedicated area by the graphics processing unit, wherein the first display signal is generated by the display controller.

3. The method of claim 1, further comprising:
    receiving a power control command directed to the host;
    determining whether the power control command is a power-on command or a power-off command;
    when the power control command is the power-on command:
        configuring the service processor to generate the display signals based on the images from the service processor; and
        powering on the host.

4. The method of claim 3, further comprising:
    when the power control command is the power-off command:
        configuring the service processor to generate the display signals based on the images from the host; and
        powering off the host.

5. The method of claim 1, further comprising:
    when the service processor is configured to generate the display signals based on the images from the service processor, detecting that the serial data are received at the serial port, wherein the first image is generated in response to the detection.

6. The method of claim 1, further comprising:
    determining that the service processor is configured to redirect video of the host to a remote device;
    reading the first image from the emulated frame buffer; and
    redirecting the first image to the remote device.

7. The method of claim 1, further comprising:
    receiving an indication from the host; and
    determining that the host has fully booted based on the indication; and
    configuring the service processor to generate the display signals based on the images from the host.

8. The method of claim 7, wherein the indication is a Power-On Self-Test (POST) code, a logic sensor state, or an Intelligent Platform Management Interface (IPMI) message.

9. An apparatus, the apparatus being a service processor, comprising:
    a memory; and
    at least one processor coupled to the memory and configured to:
    emulate a frame buffer;
    determine whether the service processor is configured to generate display signals to be sent to a display based on images from the service processor or based on images from a host of the service processor;
    when the service processor is configured to generate the display signals based on the images from the service processor:
        generate a first image based on serial data received from the host through a serial port;
        write the first image to the emulated frame buffer; and
        read the first image from the emulated frame buffer and generate a first display signal to be sent to the display based on the first image;

when the service processor is configured to generate the display signals based on images from a host:
  receive and store, at a physical buffer, a second image from the host; and
  read the second image from the physical frame buffer and generate a second display signal to be sent to the display based on the second image.

10. The apparatus of claim 9, wherein to emulate the frame buffer includes, the at least one processor is further configured to:
  (a) allocate a dedicated area of a main memory of the service processor to function as a frame buffer,
  (b) configure a graphics processing unit of the service processor to write the images from the service processor to the dedicated area, and
  (c) configure a display controller of the service processor to read, from the dedicated area, the images from the service processor and to generate the display signals based on the images from the service processor;
  wherein the first image is written to the dedicated area by the graphics processing unit, wherein the first display signal is generated by the display controller.

11. The apparatus of claim 9, wherein the at least one processor is further configured to:
  receive a power control command directed to the host;
  determine whether the power control command is a power-on command or a power-off command;
  when the power control command is the power-on command:
    configure the service processor to generate the display signals based on the images from the service processor; and
    power on the host.

12. The apparatus of claim 11, wherein the at least one processor is further configured to:
  when the power control command is the power-off command:
    configure the service processor to generate the display signals based on the images from the host; and
    power off the host.

13. The apparatus of claim 9, wherein the at least one processor is further configured to:
  when the service processor is configured to generate the display signals based on the images from the service processor, detect that the serial data are received at the serial port, wherein the first image is generated in response to the detection.

14. The apparatus of claim 9, wherein the at least one processor is further configured to:
  determine that the service processor is configured to redirect video of the host to a remote device;
  read the first image from the emulated frame buffer; and
  redirect the first image to the remote device.

15. The apparatus of claim 9, wherein the at least one processor is further configured to:
  receive an indication from the host; and
  determine that the host has fully booted based on the indication; and
  configure the service processor to generate the display signals based on the images from the host.

16. The apparatus of claim 15, wherein the indication is a Power-On Self-Test (POST) code, a logic sensor state, or an Intelligent Platform Management Interface (IPMI) message.

17. A non-transitory computer-readable medium storing computer executable code for operating a service processor, comprising code to:
  emulate a frame buffer;
  determine whether the service processor is configured to generate display signals to be sent to a display based on images from the service processor or based on images from a host of the service processor;
  when the service processor is configured to generate the display signals based on the images from the service processor:
    generate a first image based on serial data received from the host through a serial port;
    write the first image to the emulated frame buffer; and
    read the first image from the emulated frame buffer and generate a first display signal to be sent to the display based on the first image;
  when the service processor is configured to generate the display signals based on images from a host:
    receive and store, at a physical buffer, a second image from the host; and
    read the second image from the physical frame buffer and generate a second display signal to be sent to the display based on the second image.

18. The non-transitory computer-readable medium of claim 17, wherein to emulate the frame buffer includes, the code is further configured to:
  (a) allocate a dedicated area of a main memory of the service processor to function as a frame buffer,
  (b) configure a graphics processing unit of the service processor to write the images from the service processor to the dedicated area, and
  (c) configure a display controller of the service processor to read, from the dedicated area, the images from the service processor and to generate the display signals based on the images from the service processor;
  wherein the first image is written to the dedicated area by the graphics processing unit, wherein the first display signal is generated by the display controller.

19. The non-transitory computer-readable medium of claim 17, wherein the code is further configured to:
  receive a power control command directed to the host;
  determine whether the power control command is a power-on command or a power-off command;
  when the power control command is the power-on command:
    configure the service processor to generate the display signals based on the images from the service processor; and
    power on the host.

20. The non-transitory computer-readable medium of claim 19, wherein the code is further configured to:
  when the power control command is the power-off command:
    configure the service processor to generate the display signals based on the images from the host; and
    power off the host.

* * * * *